United States Patent
Grow et al.

(10) Patent No.: US 7,924,663 B2
(45) Date of Patent: Apr. 12, 2011

(54) REMOTE MONITORING DEVICE

(75) Inventors: Roger H. Grow, Lafayette, CO (US); Michael L. Leonhardt, Longmont, CO (US)

(73) Assignee: Oracle America, Inc., Redwood City, CA (US)

( * ) Notice: Subject to any disclaimer, the term of this patent is extended or adjusted under 35 U.S.C. 154(b) by 1127 days.

(21) Appl. No.: 11/429,593

(22) Filed: May 5, 2006

(65) Prior Publication Data

US 2007/0268791 A1    Nov. 22, 2007

(51) Int. Cl.
*G11B 21/08* (2006.01)
(52) U.S. Cl. ............ 369/30.64; 369/29.01; 369/30.21; 369/30.72
(58) Field of Classification Search ............ 369/24.01, 369/29.01, 30.06, 30.2, 30.21, 30.24, 30.36, 369/30.72, 53.1
See application file for complete search history.

(56) References Cited

U.S. PATENT DOCUMENTS

| | | | | |
|---|---|---|---|---|
| 5,940,355 A | * | 8/1999 | Buckland et al. | 369/30.55 |
| 6,957,291 B2 | * | 10/2005 | Moon et al. | 710/302 |
| 2002/0144044 A1 | * | 10/2002 | Moon et al. | 710/302 |
| 2004/0114477 A1 | * | 6/2004 | Reasoner et al. | 369/30.36 |
| 2004/0190396 A1 | * | 9/2004 | Coffin et al. | 369/30.43 |
| 2006/0028953 A1 | * | 2/2006 | Jensen et al. | 369/100 |

FOREIGN PATENT DOCUMENTS

JP    10-162461    *    6/1998

* cited by examiner

*Primary Examiner* — Joseph Haley
*Assistant Examiner* — Andrew J Sasinowski
(74) *Attorney, Agent, or Firm* — Polsinelli Shughart PC

(57) ABSTRACT

In one embodiment, an apparatus for a remote monitoring device is disclosed. The apparatus includes a casing to fit at least one of a storage location for storage media and handling mechanisms for the storage media, the storage location and the handling mechanisms being part of a media storage library, one or more monitoring devices within the casing to obtain from the media storage library at least one of environmental measurements and images of components in the media storage library, and a communication transmitter within the casing and communicatively coupled to the one or more monitoring devices to transmit at least one of data signals representing the at least one of environmental measurements and images of the components in the media storage library. Other embodiments are also disclosed.

20 Claims, 4 Drawing Sheets

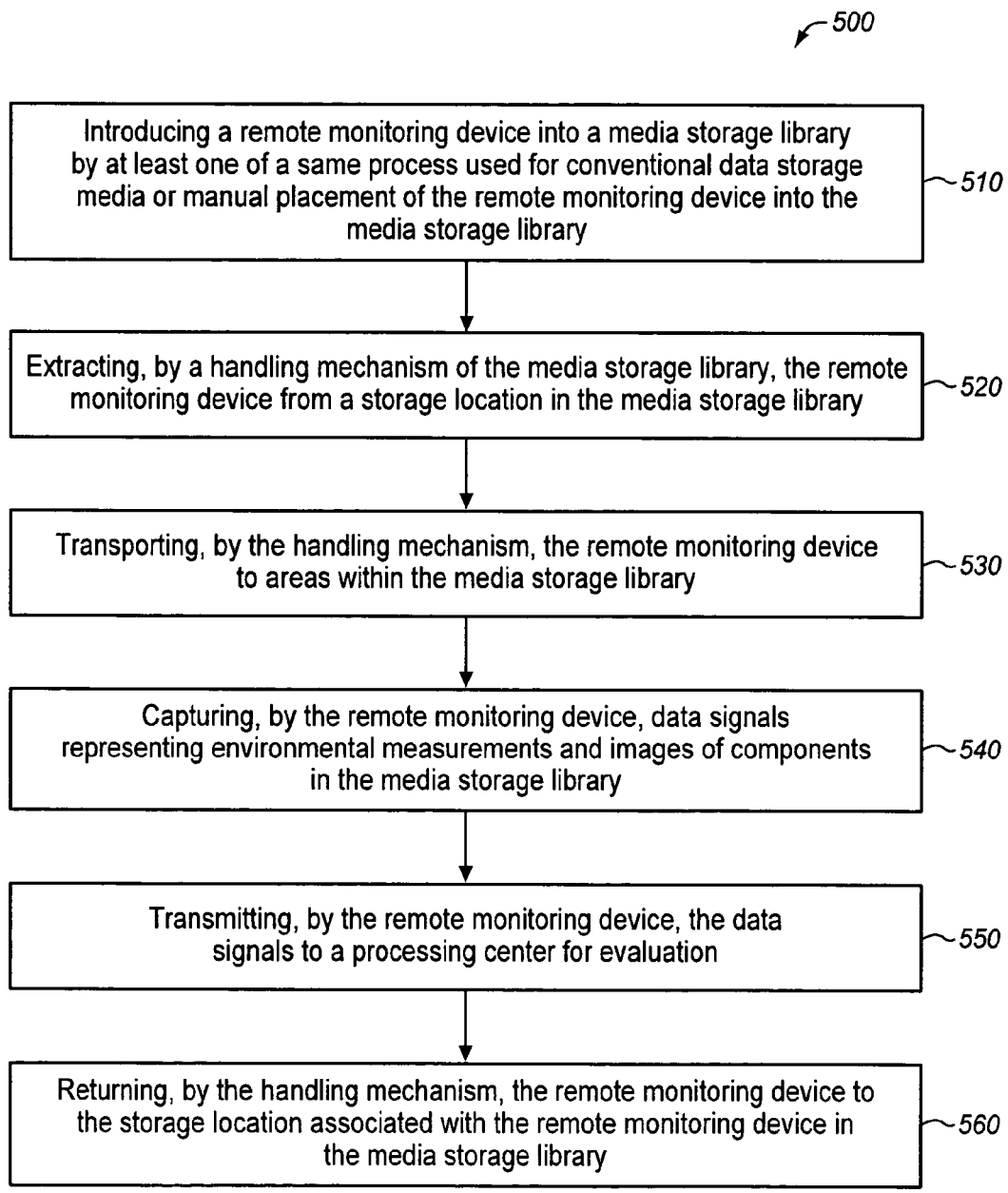

REMOTE MONITORING DEVICE

FIELD OF INVENTION

An embodiment of the invention relates to media storage libraries, and more specifically, to a remote monitoring device for use in a media storage library.

BACKGROUND OF INVENTION

Many media storage applications (e.g., archives) require that the information on storage media be maintained for extended periods of time. Typical media types include magnetic tape, magnetic disk, optical disk, holographic disk and the like. Depending upon the specific media type, information maybe stored in the form of magnetic domains, optical features, interference patterns or the like. All media types are subject to damage from excessive environmental and handling conditions.

These various types of media can be kept in passive physical storage (e.g. on shelves) where some manual operations take place to retrieve the media and place it in an appropriate device (e.g., a "drive" or "system") to access the stored information. The media types may also be kept in active physical storage, such as within a space accessible by a robotic system. The robotic system is typically under computer control and automatically retrieves the media, delivers it to the appropriate information access device for reading and/or writing, and upon completion of the media access task returns the media to its active storage location. Such data storage media is in widespread use both commercially and in the consumer marketplace.

For example, media storage libraries are capable of storing and retrieving large quantities of information stored on media cartridges. This is accomplished by the use of a large number of cartridge storage cells, each of which houses a media cartridge. These arrays of cartridge storage cells are housed within an enclosure of the media storage library. Such media storage libraries use a robotic mechanism to quickly move the media cartridges between their cartridge storage cells and media drives.

For instance, to retrieve information that is stored on a selected media cartridge, a robotic mechanism moves to the cartridge storage cell location that houses the selected media cartridge. A gripper mechanism that is part of the robotic mechanism grasps the media cartridge, extracts it from the cartridge storage cell, transports it to a media drive location, and then loads the media cartridge into the media drive.

In commercial applications, vast quantities of storage media are used by business data processing operations to store vital business records. The business environment also is making increasing use of automated systems to handle its media. Business practices and government regulations make it critical for storage media-based information to be protected from loss due to physical damage, as well as access delays due to system breakdown.

Frequently, it is desired by various personnel to physically enter a media storage library for maintenance or diagnostic services related to protecting the media storage from losses or access delays. For instance, the personnel may want to visually inspect one or more of the media drives, media cartridge storage cells, or media handling spaces within the media storage library enclosure. However, it may be difficult or impossible for a person to physically enter, maneuver, comprehensively inspect, and exit a media storage library. In addition, for security and confidentiality reasons, limiting the presence of persons within the media storage library is vital.

Furthermore, any sized library that is opened for either direct human ingress or egress, or merely for visual inspection from the outside leaves the library in an unknown state. Media may have been added, removed, or shifted in position. Likewise, mechanisms may have suffered damage from accidental contact. At best, an "audit" must be performed once the library is closed to confirm the media location and presence and to check operation of the media handlers and media drives. The audit is undesirable in that it requires the suspension, or at least slowing, of normal media library operations. In instances of "lights-out" installations where there are no local operators, it is a logistics challenge to both schedule and provide personnel to perform physical inspections. Further, if the robotic library is deemed "confined space," regulations may require the presence of multiple individuals.

Currently, it is possible to add windows to the media storage library for visual inspection purposes. However, these windows only give a limited view into the library and important cartridge storage cell space is lost when these windows are added. In addition, there is presently a capability to hard-mount video cameras in the media storage library. Yet, these hard-mounted cameras have limited use and visibility because of their lack of mobility. The importance of the storage media and its timely access has created the need for new and efficient tools and methods to monitor the conditions and diagnose the failures of the media storage libraries' storage environment and those systems relied upon for fast media access. An alternate way to visually inspect the interior of the media storage library would be beneficial.

SUMMARY OF INVENTION

The present invention includes novel apparatus and method for a remote monitoring device.

According to one embodiment of the invention, an apparatus is disclosed. The apparatus includes a casing to fit at least one of a storage location for storage media and handling mechanisms for the storage media, the storage location and the handling mechanisms being part of a media storage library, one or more monitoring devices within the casing to obtain from the media storage library at least one of environmental measurements and images of components in the media storage library, and a communication transmitter within the casing and communicatively coupled to the one or more monitoring devices to transmit at least one of data signals representing the at least one of environmental measurements and images of the components in the media storage library.

According to another embodiment of the invention, a method is disclosed. The method includes: extracting, by a handling mechanism of a media storage library, a remote monitoring device from a storage location of the media storage library; transporting, by the handling mechanism, the remote monitoring device to one or more areas within the media storage library; capturing, by the remote monitoring device, at least one of environmental measurements and images of components in the media storage library; and transmitting, by the remote monitoring device, data signals representing the at least one of environmental measurements and images of the components in the media storage library.

BRIEF DESCRIPTION OF THE DRAWINGS

The invention may be best understood by referring to the following description and accompanying drawings that are used to illustrate embodiments of the invention. In the drawings:

FIG. 5 is a flow diagram illustrating a method according to one embodiment of the invention.

DETAILED DESCRIPTION

An apparatus and method are described for a remote monitoring device. According to one embodiment, the apparatus includes a casing to fit at least one of a storage location for storage media and handling mechanisms for the storage media, the storage location and the handling mechanisms being part of a media storage library, one or more monitoring devices within the casing to obtain from the media storage library at least one of environmental measurements and images of components in the media storage library, and a communication transmitter within the casing and communicatively coupled to the one or more monitoring devices to transmit at least one of data signals representing the at least one of environmental measurements and images of the components in the media storage library.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Figure 1:
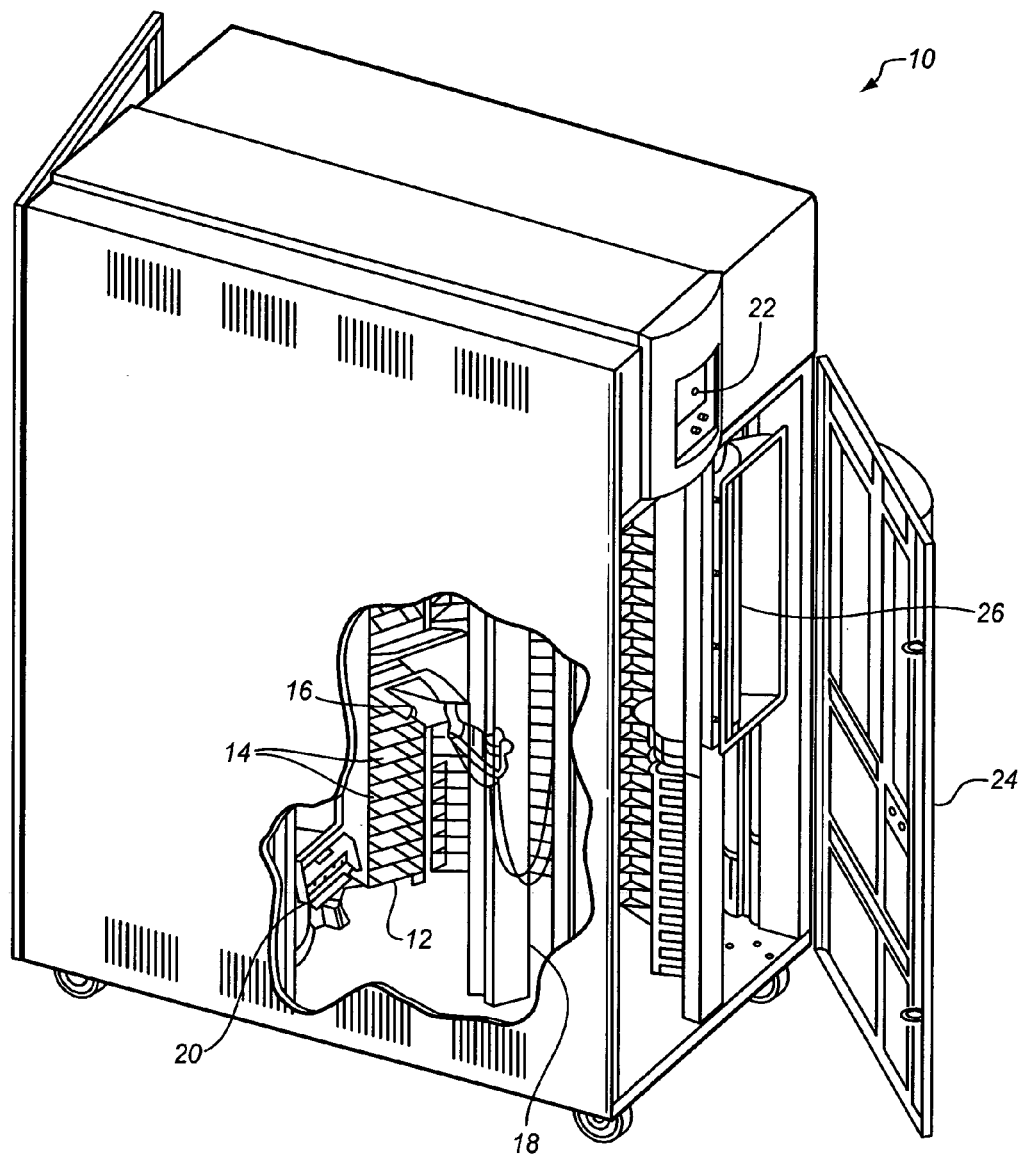
FIG. 1 is a block diagram of one embodiment of a media storage library.

Embodiments of the invention introduce a remote monitoring device for use in a media storage and handling environment. FIG. 1 is a block diagram illustrating an exemplary media storage library 10 for use with embodiments of the invention. Media storage library 10 includes a storage frame 12 having an array of storage locations 14 for storing media cartridges 16. Media storage library further includes a handling mechanism 18 to enable the media storage library 10 to manipulate media cartridges 16. In some embodiments of the invention, storage locations 14 are not limited to their depiction in FIG. 1, and may include data cartridge storage cells, storage magazines, trays, boxes, containers, and the like.

In one embodiment, media cartridges 16 may be of an arbitrary storage media type. For example, media cartridges may store media types including magnetic tape, magnetic disk, optical disk, holographic disk and the like. In other embodiments of the invention, the handling mechanism 18 may be a robotic handling mechanism or a manual handling mechanism.

Media storage library 10 also includes one or more media drives 20. In one embodiment, storage locations 14 and media drives 20 are positioned in vertical columns around the robotic mechanism 18. Each storage location 14 may be designed to house a single media cartridge 16. Handling mechanism 18 moves around the media storage library 10 to access the storage locations 14 and media drives 20. In one embodiment, handling mechanism 18 may contain a movable carriage that is capable of transporting robotic components, such as a picker mechanism, line scan camera, and other task orientated sub-modules.

A media storage library control panel 22 is positioned in an exposed area of the media storage library 10 for access by an operator. In one embodiment, control panel 22 may support one or more manual local operations of the media storage library 10. Media storage library 10 may further include a front door 24 for allowing and preventing operator access into the interior of the media storage library 10. Media storage library 10 may also include a cartridge access port 26 for permitting removal and entry of media cartridges 16 into the media storage library 10. One skilled in the art will appreciate that media storage library is not limited to a robotic media storage library, as depicted in FIG. 1, may be further be, for example, a manual media storage library.

Figure 2:
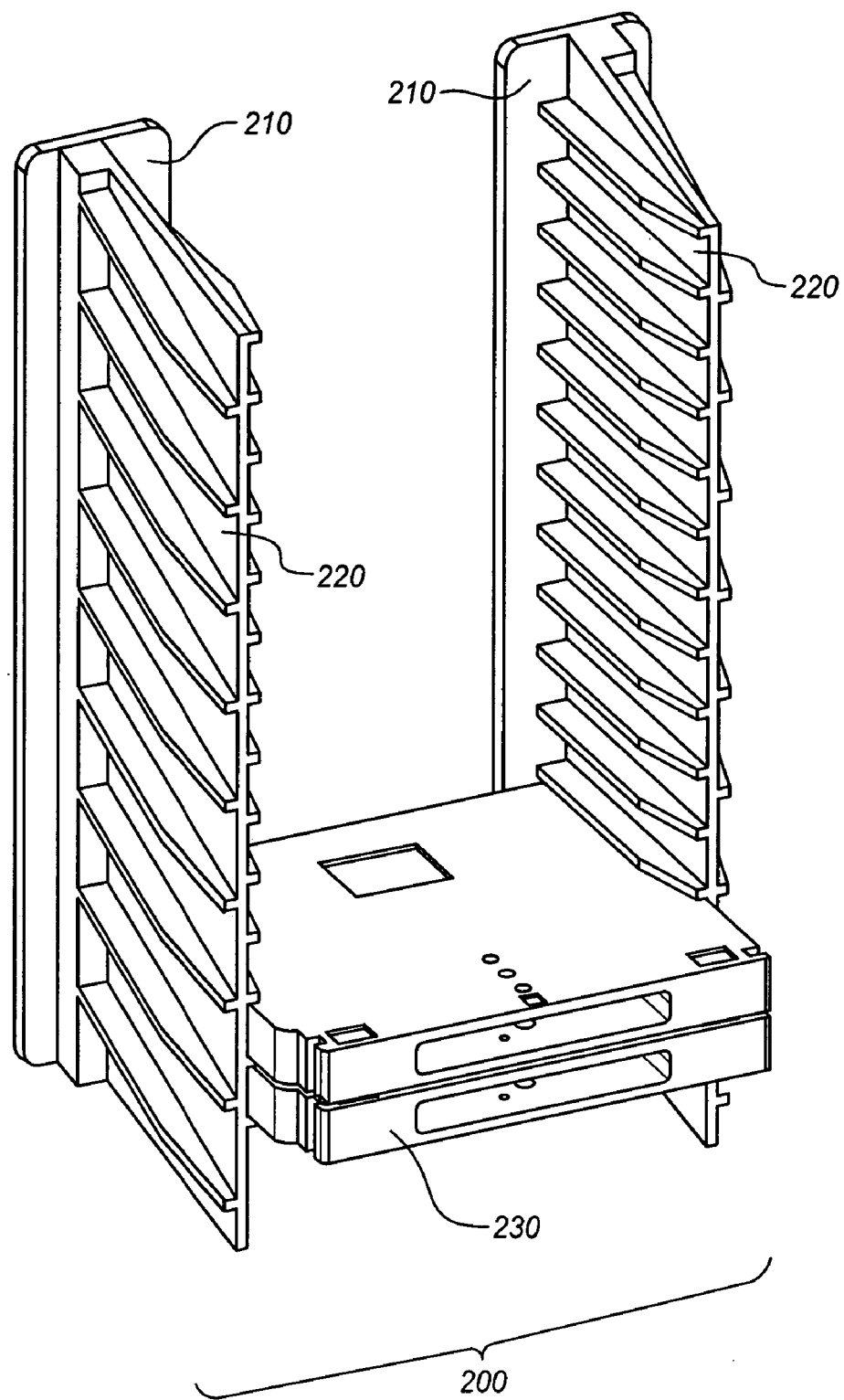
FIG. 2 illustrates one embodiment of an array of cartridge storage cells for use in a media storage library.

FIG. 2 illustrates an array of storage locations for use in a media storage library, such as media storage library 10 described with respect to FIG. 1. Array 200 may be used to store multiple media cartridges in a media storage library. Array 200 includes a pair of two-sided partitions 210, which are spaced apart and aligned with each other. Array 200 further includes slots 220 to hold one or more media cartridges 230. In one embodiment, the slots may be slanted to bias the media cartridges towards a back wall of the array 200. Array 200 may be horizontally or vertically configured within a media storage library. In one embodiment, a robotic mechanism (not shown) of a media storage library may approach a media cartridge 230 stored in array 200, and utilize a gripper mechanism to extract the media cartridge 230 from the array 200.

In one embodiment, a media storage and handling environment, such as the media storage library described with respect to FIG. 1, may be more effectively monitored and diagnosed by using a family of remote monitoring devices that are handled and managed by the same systems used for the storage media. These remote monitoring devices may be in a similar form factor as the storage media so that they may be handled, introduced into, stored within, and retrieved from the media storage and handling environment in a similar fashion as the storage media itself.

Figure 3:
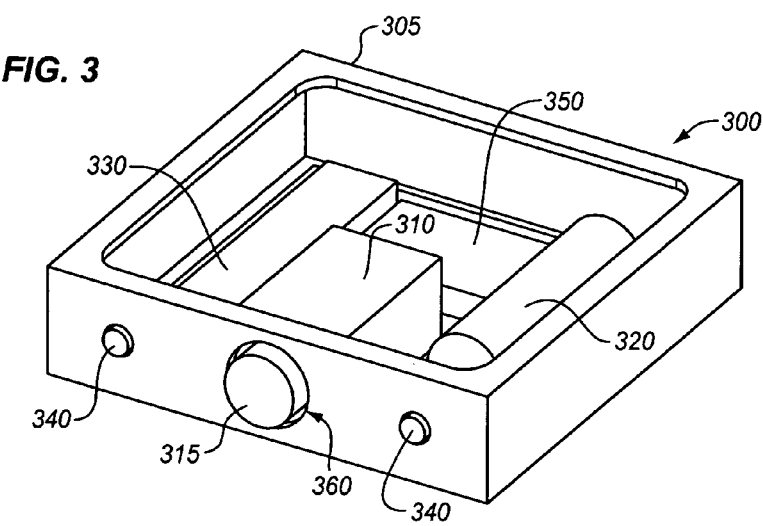
FIG. 3 is a block diagram illustrating one embodiment of a remote monitoring device.

FIG. 3 is a block diagram illustrating one embodiment of a remote monitoring device for use in a media storage and handling environment. In one embodiment, the remote monitoring device 300 is stored in an array of storage locations within a media storage library, such as those described with respect to FIGS. 1 and 2. Embodiments of the remote monitoring device may be utilized to solve the problem of optimal visual inspection of a media storage library. Implementing the remote monitoring device of embodiments of the invention, which a handling mechanism of the media storage library may transport and manipulate, would give an operator complete control of a monitoring device to view, monitor, and diagnose many parts of the library.

Embodiments of the remote monitoring device 300 may have a casing 305, such as a plastic shell, similar in shape and size to a typical media cartridge used in a media storage library. For instance, the remote monitoring device 300 may be of the same form factor as a data storage cartridge typically stored in the media storage library. This data cartridge may be one storing magnetic tape, magnetic disk, optical tape, optical disk, solid state memory, or holographic memory, for instance.

The remote monitoring device includes within this casing 305 a circuit board with one or more monitoring sensors 310, power sources 320, a communication transmitter 330, illumination sources 340, a processor 350, and any other essential electronics (not shown), such as a memory, inductive charging system, etc.

In some embodiments of the invention, the one or more monitoring sensors 310 is an imaging device that may be a either a video or a still imager or camera. In further embodiments, this imaging device may provide visible or infrared (IR) video. In one embodiment, an imaging device lens 315 of the imaging device is fixed within an opening 360 through the casing 305 of the remote monitoring device 300 so that the imaging device may capture images outside of the remote monitoring device 300. As media storage libraries tend to be dark environments, the illumination sources 340 of the remote monitoring device 300 provide a light source for optimal viewing of the interior of a media storage library. In one embodiment, the illumination sources 340 are light emitting diodes (LEDs).

In one embodiment, the remote monitoring device 300 may be stored in a storage location, such as a cartridge storage cell, of the media storage library in a similar fashion to typical media cartridges. Furthermore, the remote monitoring device 300 may be introduced into the media storage library by the same processes used for conventional data storage media or by manual placement of the device into the media storage library. A handling mechanism that manipulates the media cartridges in the media storage library may extract the remote monitoring device 300 and transport it to any location that the handling mechanism is capable of accessing within the media storage library. The remote monitoring device 300 may then be utilized for monitoring and diagnostic purposes.

For example, the handling mechanism may transport the remote monitoring device 300 to a location in front of a media drive to view the media drive for abnormal physical conditions, presence of media cartridges, or the state of read drive status indicators. In one embodiment, the remote monitoring device 300 may include more than one imaging device 310 in order to provide multiple simultaneous views of the interior of the media storage library.

In one embodiment, the remote monitoring device 300 may utilize a variety other monitoring sensors 310 in order to monitor the environmental conditions of the media storage library. The monitoring sensors 310 may include sonic detectors, subsonic detectors, supersonic detectors, temperature sensors, humidity sensors, shock sensor, seismic sensors, vibration sensors, radiation sensors, orientation sensors, and air quality sensors. These sensors may be utilized to detect environmental conditions within the media storage library such as noise, temperature, humidity, shock, vibration, radiation, and contaminants. In one embodiment, the one or more monitoring sensors 310 may utilize the opening 360 through the remote monitoring device as port to gather the environmental information they are collecting. In other embodiments, it is envisioned that the one or more monitoring sensors 310 may utilize additional ports through the casing 305 of the remote monitoring device to collect their information.

The remote monitoring device 300 may operate in a real-time manner by transmitting its collected signals, such a video and data signals gathered from the monitoring sensors 310, to one or more receiving stations for subsequent analysis. This transmission may be accomplished via the communication transmitter 330 within the remote monitoring device 300. In some embodiments, the transmission may be accomplished via wireless, radio frequency (RF), optical, inductive, capacitive, connector-based, and contact-based. The transmission may be controlled by manual or automated systems using pre-established or learned policies (e.g., artificial intelligence).

In one embodiment, the opening 360 through the remote monitoring device 300 for the one or more monitoring sensors 310 is located on a panel of the remote monitoring device that faces a back wall of the storage array in which the remote monitoring device is stored. In this way, when a handling mechanism extracts the remote monitoring device 300, the opening 360 will face outwards from the handling mechanism to the interior of the media storage library. For example, an imaging device of the remote monitoring device 300 may then capture images of other media cartridges and media drives of the media storage library while being held by the handling mechanism.

In some embodiments, the remote monitoring device 300 may store its detected information in onboard internal memory for later transmission and analysis when the device is in a sensing location. In other embodiments, the transmission may be real-time as the data signals are collected. The data analysis may include algorithms (including pattern recognition) to identify and signal a "go, no-go" condition to an operator for intervention.

In some embodiments, the remote monitoring device 300 may utilize self-contained power sources 320 for operation, power coupled in by external sources wirelessly (e.g. electromagnetically, inductively, capacitively), or power provided by contact with powered physical connections within the monitored environment (e.g., similar to a wireless phone on a charging stand). The data, control, and power connections for the remote monitoring device 300 may utilize RF, inductive, capacitive, or optical means. Hard signal connections may utilize conventional electrical contacts, zero insertion force connections, brushes, spring loaded contacts, and the like.

In some embodiments, the remote monitoring device 300 may be stored within the monitored environment (e.g., media storage library) or introduced as needed and later removed. The remote monitoring device 300 may include a "heartbeat" function to communicate its status. Such status communication may include informing of its specific presence, confirming normal operations, warning of failure or impending failure, and alerting of certain conditions such as low battery power, filled on-board storage, and so on.

In some embodiments, the remote monitoring device 300 may also include a labeling identification device (not shown) to recognize identification labels of specific module types in the media storage library. For example, the remote monitoring device 300 may use this labeling identification device to identify (or in the case of an RFID label, communicate with) components of the media storage library without permanently encumbering a handling mechanism of the media storage library with the actual scanning device. The labels being identified may, in some embodiments, be optically readable, human readable, RF readable, or RF writable, to name a few examples.

The remote monitoring device 300 may also include its own programmable processor 350 to control the collection of information including the activation/deactivation of sensors, sending of data, status, receiving of data collection instructions and the like—chronologically or otherwise controlled internally or externally. The processor 350 may provide control over the components of the remote monitoring device 300. For example, it may control the zoom, focus, position, sensitivity, and range calibration of the imaging device 310. The processor 350 may also provide controls over the monitoring sensors such as sensor activation by time, sensor activation period, power control, responses to outside control signals, generation of control signals for transmission from the remote monitoring device, formatting of data from the sensors, access control, analysis of sensor data, encryption of data signals, decryption of control signals, analog to digital signal conversion, and digital to analog signal conversion. The remote monitoring device 300 may operate independently or interact with an external system (automated or manual) to dynamically modify internal programming and/or react to varying and changing circumstances and conditions.

Figure 4A:
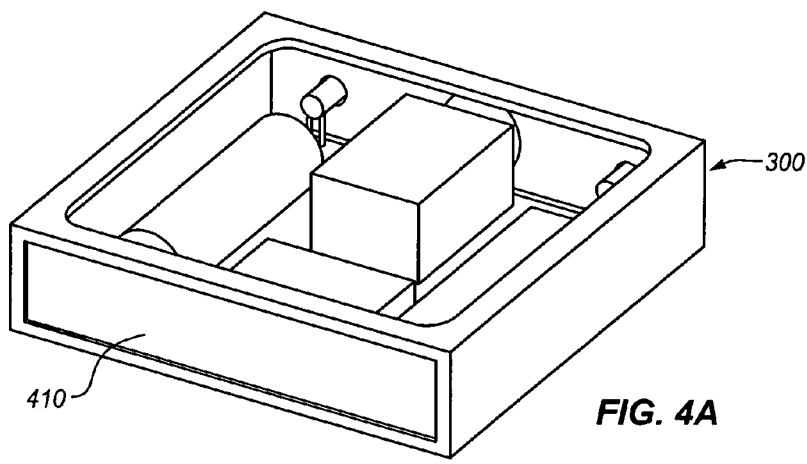
FIGS. 4A and 4B are block diagrams illustrating additional views of one embodiment of a remote monitoring device.
Figure 4B:
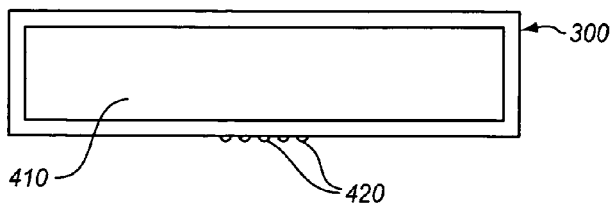

FIGS. 4A and 4B illustrate additional views of an embodiment of the remote monitoring device. In one embodiment, the components of the remote monitoring devices illustrated in these figures may be the same as those described with respect to FIG. 3. FIG. 4A shows a rear view of the remote monitoring device 300. Identification label 410 identifies the remote monitoring device 300 and may be used for inventory purposes of the media storage library. Identification label 410 may be optically readable, human readable, RF readable, or RF writable, to name a few examples. The identification labels may also contain information including a serial number, data code, manufacturer, sensor type, apparatus status, control information, and sensor data. In one embodiment, when the remote monitoring device 300 is placed in a storage location of the media storage library, identification label 410 faces outward towards the interior of the media storage library so that a scanning mechanism on the handling mechanism may identify the remote monitoring device.

FIG. 4B illustrates an additional view of the remote monitoring device 300. Physical contacts 420 on the exterior of the remote monitoring device are shown in this view. These physical contacts 420 may be located on the remote monitoring device 300 so that they align with matching contacts located in the storage location that holds the remote monitoring device. In one embodiment, it is envisioned that the physical contacts 420 may be further utilized to transmit data, control, and/or power transmission signals into or out of the remote monitoring device 300.

FIG. 5 is a flow diagram illustrating a method of one embodiment of the invention. Process 500 is a method for utilizing a remote monitoring device in a media storage library for diagnostic and service purposes. Process 500 begins at processing block 510, where a remote monitoring device is introduced into a media storage library by at least one of a same process used for conventional data storage media or manual placement of the remote monitoring device into the media storage library. The remote monitoring device may be the same as the remote monitoring devices 300, 400 described with respect to FIGS. 3 and 4.

Then, at processing block 520, a handling mechanism of the media storage library extracts the remote monitoring device from a storage location in the media storage library. At processing block 530, the handling mechanism transports the remote monitoring device to one or more areas within the media storage library. Then, at processing block 540, the remote monitoring device captures data signals representing environmental measurements and images of components of the media storage library.

At processing block 550, the remote monitoring device transmits the data signals to a processing center for evaluation. Finally, at processing block 560, the robotic mechanism returns the remote monitoring device to its cartridge storage cell in the media storage library. It is envisioned that the processing steps of process 500 may occur in a variety of different orders, with additional steps, with additional sub-steps, or with steps removed.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. An apparatus, comprising:
   a remote monitoring device to fit at least one of a plurality of storage locations for storage media and handling mechanisms for the storage media, the storage location and the handling mechanisms being part of a media storage library;
   a plurality of monitoring devices within the remote monitoring device, wherein a first monitoring device of the plurality of monitoring devices obtains from the media storage library at least one environmental measurement of an environmental condition within the media storage library and a second monitoring device of the plurality of monitoring devices obtains images of components in the media storage library;
   a processor encoded with data collection instructions to dynamically activate the first monitoring device to obtain the at least one environmental measurement and to dynamically activate second monitoring device to obtain the images; and
   a communication transmitter within the remote monitoring device and communicatively coupled to the plurality of monitoring devices to transmit at least one of data signals representing the at least one of environmental measurement and images of the components in the media storage library.

2. The apparatus of claim 1, wherein the images of the components in the media storage library include at least one of images of storage locations, images of handling mechanisms, images of robotic media storage library components, and images of manual media storage library components.

3. The apparatus of claim 1, wherein the remote monitoring device is a same form factor as a data storage cartridge containing at least one of magnetic tape, magnetic disk, optical tape, optical disk, solid state memory, and holographic memory.

4. The apparatus of claim 1, further comprising a power source within the remote monitoring device to supply power to the plurality of monitoring sensors and the communication transmitter, wherein the power source is at least one of an internal battery, an internal capacitor, an inductive power receiver, a radio frequency power receiver, and a capacitive power receiver.

5. The apparatus of claim 1, wherein the communication transmitter is at least one of wireless, radio frequency, optical, inductive, capacitive, connector-based, and contact-based.

6. The apparatus of claim 1, wherein the first monitoring device, is at least one of a sonic detector, a subsonic detector, a supersonic detector, a temperature sensor, a humidity sensor, a shock sensor, a vibration sensor, a radiation sensor, a seismic sensor, an orientation sensor, and an air quality sensor.

7. The apparatus of claim 1, wherein the second monitoring device is at least one of a visible light video imager, a visible light still imager, a visible light line scanning imager, an infra-red video imager, an infra-red still imager, and an infra-red line scanning imager.

8. The apparatus of claim 1, further comprising an identifier attached to the remote monitoring device to identify the apparatus, the identifier being at least one of optically readable, human readable, radio frequency readable, and radio frequency writable.

9. The apparatus of claim 8, wherein the identifier contains information that includes at least one of a serial number, a data code, a manufacturer, a sensor type, an apparatus status, control information, and sensor data.

10. The apparatus of claim 1, wherein the data collection instructions are executed by the processor within the remote monitoring device to control the plurality of monitoring devices by providing at least one of sensor activation by based on time, sensor activation period, power control, responses to outside control signals, generation of control signals, formatting data from the sensors, access control of the sensors, analysis of sensor data, encryption of data signals, decryption of control signals, analog to digital signal conversion, and digital to analog signal conversion.

11. A media storage library, comprising:
   a handling mechanism to manipulate media cartridges between one or more storage locations and one or more media drives, the one or more storage locations and the one or more media drives within the media storage library; and
   a remote monitoring device to fit in the one or more storage locations and capable of being handled by the handling mechanism, the remote monitoring device including:
      a plurality of monitoring devices to obtain from the media storage library at least one environmental measurement of an environmental condition within the media storage library and at least one image of components in the media storage library;
      a processor encoded with data collection instructions to dynamically activate the plurality of monitoring devices to obtain the at least one environmental measurement and the at least one image; and
      a communication transmitter communicatively coupled to the plurality of monitoring devices to transmit at least one of data signals representing the at least one environmental measurement and at least one image of components in the media storage library.

12. The media storage library of claim 11, wherein the remote monitoring device is a same form factor as a data storage cartridge containing at least one of magnetic tape, magnetic disk, optical tape, optical disk, solid state memory, and holographic memory.

13. The media storage library of claim 11, wherein the communication transmitter is at least one of wireless, radio frequency, optical, inductive, capacitive, connector-based, and contact-based.

14. The media storage library of claim 11, wherein the first monitoring device, is at least one of a sonic detector, a subsonic detector, a supersonic detector, a temperature sensor, a humidity sensor, a shock sensor, a vibration sensor, a radiation sensor, a seismic sensor, an orientation sensor, and an air quality sensor.

15. The media storage library of claim 11, wherein the second monitoring device is at least one of a visible light video imager, a visible light still imager, a visible light line scanning imager, an infra-red video imager, an infra-red still imager, and an infra-red line scanning imager.

16. The media storage library of claim 11, further comprising an identifier attached to the casing to identify the apparatus, the identifier being at least one of optically readable, human readable, radio frequency readable, and radio frequency writable.

17. A method comprising:
   extracting, by a handling mechanism of a media storage library, a remote monitoring device from a storage location of the media storage library;
   transporting, by the handling mechanism, the remote monitoring device to one or more areas within the media storage library;
   dynamically activating a plurality of monitoring devices within the remote monitoring device according to data collection instructions being executed by a processor to capture, at least one environmental measurement and at least one image of components in the media storage library; and
   transmitting, by the remote monitoring device, data signals representing at least one of the at least one environmental measurement and the at least one image of the components in the media storage library.

18. The method of claim 17, further comprising:
   introducing the remote monitoring device into the media storage library by at least one of a same process used for data storage media or manual placement of the remote monitoring device into the media storage library; and
   returning, by the handling mechanism, the remote monitoring device to the storage location associated with the remote monitoring device.

19. The method of claim 17, wherein the remote monitoring device includes:
   the plurality of monitoring devices to obtain, from the media storage library, the at least one environmental measurement and the at least one image of the components in the media storage library; and
   a communication transmitter communicatively coupled to the plurality of monitoring devices to transmit data signals representing at least one of the at least one environmental measurement and the at least one image of the components in the media storage library.

20. The method of claim 19, wherein the plurality of monitoring devices include one or more of an imager, a sonic detector, a subsonic detector, a supersonic detector, a temperature sensor, a humidity sensor, a shock sensor, a vibration sensor, a radiation sensor, a seismic sensor, an orientation sensor, and an air quality sensor.

* * * * *

UNITED STATES PATENT AND TRADEMARK OFFICE
CERTIFICATE OF CORRECTION

| | | |
|---|---|---|
| PATENT NO. | : 7,924,663 B2 | Page 1 of 1 |
| APPLICATION NO. | : 11/429593 | |
| DATED | : April 12, 2011 | |
| INVENTOR(S) | : Grow et al. | |

It is certified that error appears in the above-identified patent and that said Letters Patent is hereby corrected as shown below:

In column 9, line 24 delete the word "by" preceding "based".
In column 10, line 27 delete the ",".

Signed and Sealed this
Twenty-eighth Day of February, 2012

David J. Kappos
*Director of the United States Patent and Trademark Office*